No. 689,635. Patented Dec. 24, 1901.
T. CARNEY.
WINDMILL.
(Application filed Aug. 26, 1901.)
(No Model.) 2 Sheets—Sheet 1.
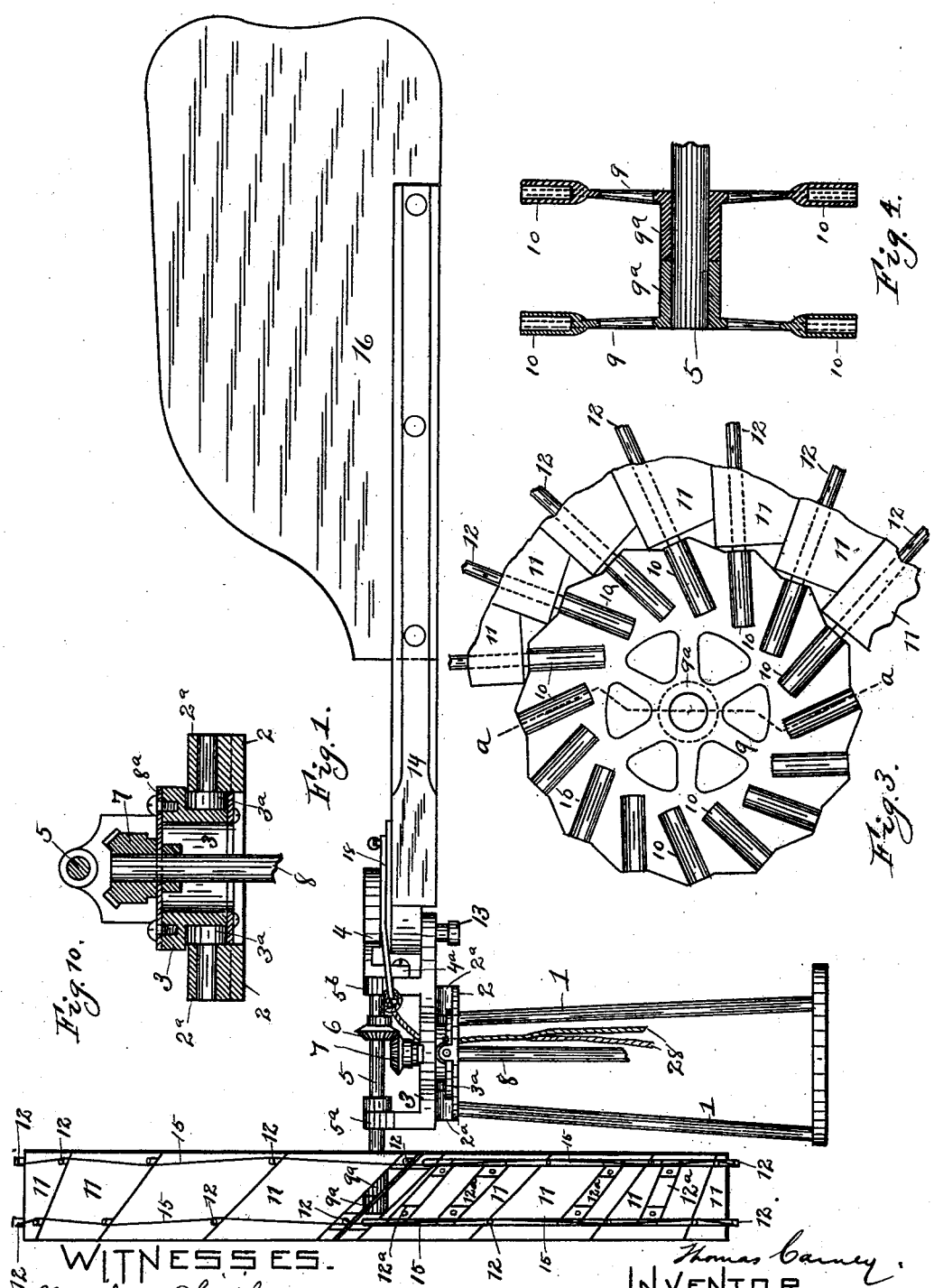

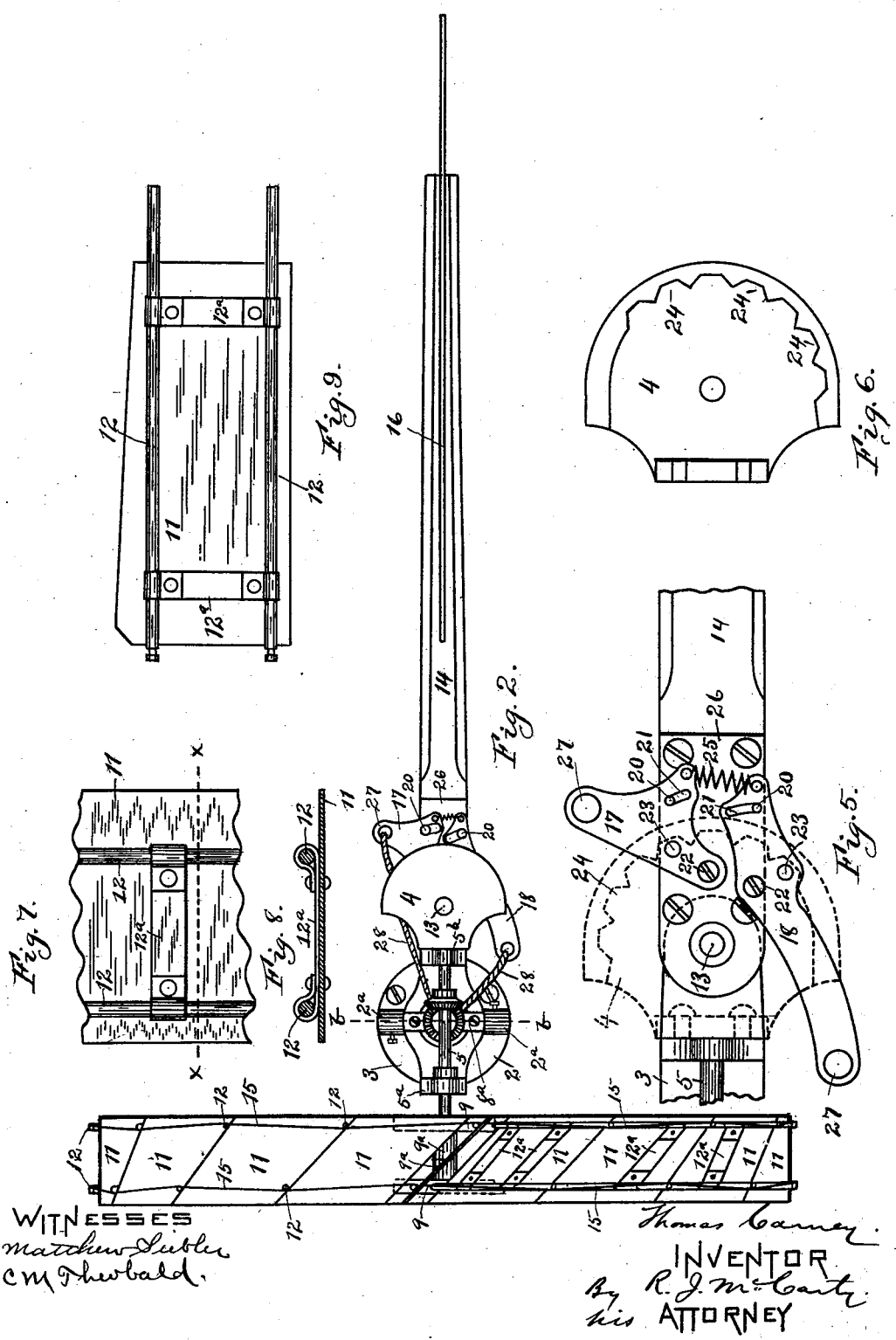

UNITED STATES PATENT OFFICE.

THOMAS CARNEY, OF DAYTON, OHIO.

WINDMILL.

SPECIFICATION forming part of Letters Patent No. 689,635, dated December 24, 1901.

Application filed August 26, 1901. Serial No. 73,254. (No model.)

*To all whom it may concern:*

Be it known that I, THOMAS CARNEY, a citizen of the United States, residing at Dayton, in the county of Montgomery and State of Ohio, have invented certain new and useful Improvements in Windmills; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in windmills.

The objects of the invention are, first, to provide a windmill in which the wind-wheel may be increased or decreased in diameter by simply detaching the wind-blades and replacing them by blades of larger or smaller dimensions, as the case may be; secondly, to provide a windmill in which the friction is reduced to a minimum, and, thirdly, to provide means for manipulating the tail-vane to throw the same out of the wind and into the wind, as the case may be.

Preceding a detail description of my invention reference is made to the accompanying drawings, of which—

Figure 1 is a side elevation of my improved windmill. Fig. 2 is a top plan view. Figs. 3 and 4 are detail views of the hub, the latter being on the line $a\ a$ of Fig. 3. Figs. 5 and 6 are detail views showing the mechanism for throwing the wind-wheel in and out of the wind. Fig. 7 is a detail view of a portion of one of the wind-blades. Fig. 8 is a section on the line $x\ x$ of Fig. 7. Fig. 9 is a detail plan view of one of the wheel-blades. Fig. 10 is a sectional view through the turn-table on the line $b\ b$ of Fig. 2.

In a detail description of the invention similar reference characters indicate corresponding parts.

1 designates the upright frame of the mill, on the upper portion of which is a turn-table 2, having four bearings $2^a$, in which are mounted roller-bearings $3^a$. (See Fig. 10.)

3 designates the bearing for the horizontal wheel-shaft 5 and the upright power-transmitting shaft, which are geared to each other by miter-gears 6 and 7.

9 9 designate the wheel-hub, which is constructed in two parts with integral sleeve portions $9^a\ 9^a$, which abut with each other and receive the wheel-shaft 5, as shown in Fig. 4. The rims of these hubs 9 9 are provided with a series of sockets 10, which receive the inner ends of rods 12 12, to which the wheel-blades 11 are secured. (See Fig. 9.) On one side of each of said wheel-blades 11 there are clips $12^a$, which receive the rods 12. These wheel-blades are mounted on the hub in parallel uniform angular positions and are tied together at their outer edges by tie-wires 15 15, which are united to the outer ends of each of the rods 12, and thereby said blades are maintained in proper relative positions at their outer ends and are held securely in their sockets 10.

It will seen that a hub such as is shown in Figs. 3 and 4 is adapted to support any desired length of wheel-blades and that the said blades may be easily removed therefrom and blades of different dimensions placed in position in the hub. The wheel-shaft 5 has but two points of bearing $5^a\ 5^b$ and transmits motion to the shaft 8 through two gears, as hereinbefore stated. It will therefore be seen that the amount of friction due to the rotation of the wheel-shaft and to the driving of the upright shaft 8 is comparatively small. The wheel consists of the blades 11 and the hub and is very light, the blades being constructed of sheet metal having only the requisite strength to meet the strain due to the force of the wind thereagainst. The bearing 3 has for its pivot the upright shaft 8, which is journaled in the cross-piece $8^a$, which is united to the upper side of said bearing 3, as shown in Fig. 2. 14 designates an arm, which is secured to the rearward portion of the bearing 3 by a pivot-bolt 13.

4 designates a plate which has a downwardly-projected portion $4^a$, which is secured to the bearing-plate 3. This plate 4 incloses the upper side of the arm 14 above the connection 13 of said arm with the bearing-plate 3. The lower side of the plate 4 has a series of locking-recesses 24, as shown in dotted lines in Fig. 5 and in full lines in Fig. 6. This structural figure will be again referred to. The arm 14 carries a tail-vane 16. The said tail-vane may be turned to throw the wheel in or out of the wind on the pivot-bolt 13 by the following means:

Referring to Figs. 5 and 6, 17 and 18 designate two plates which are pivoted at 22 to a plate 26, the latter being connected to the upper side of the inner end of the arm 14. These plates each have a stud 23 projecting upwardly, which lie in positions to enter the recesses 24 in the lower side of the cap or plate 4. 21 designates two slots, one in each of said plates, into which pins 20 project from the plate 26. These pins and slots serve to limit the movements of the plates 17 and 18 in both directions of their movements. 25 is a coil-spring which connects said plates and normally maintains them in positions with the pins 23 in the recesses 24. Connected to the plates 17 and 18 at 27 are two ropes 28, which pass down through the opening in the turn-table in positions to be drawn upon. Plate 17 is instrumental in throwing the tail-vane out of the wind by pulling upon the rope 28, connected therewith. The movement of said tail-vane may be at any angle between the position at right angles to the wheel, as shown in Figs. 1 and 2, and a position parallel to the wheel, the latter position being the extreme position to take the wheel out of the wind. Plate 18 is instrumental in throwing the tail-vane in a straight position, as in Fig. 2, in which position the wind-wheel is taking wind.

Having described my invention, I claim—

1. In a windmill, the combination of the wheel-shaft having two points of bearing, and a power-transmitting shaft driven therefrom by two gears which occupy the space between the two bearings of the wheel-shaft, a wind-wheel the blades of which are united to the hub by means of two parallel rods which are united to each blade throughout the length thereof, said blades having their outer ends united by tie-wires which extend around the circumference of the wheel.

2. In a windmill, the combination with a turn-table, a bearing-plate mounted on said turn-table, and a wind-wheel the shaft of which is journaled in said bearing-plate, of a tail-vane pivoted to said bearing-plate, locking mechanisms consisting of two pivotal plates, and a ratchet, one of said plates being adapted to throw the tail-vane out of the wind, and the other of said plates being adapted to return said tail-vane to the wind.

3. In a windmill the combination with a turn-table, a bearing-plate mounted thereon, and a wind-wheel the shaft of which has two points of bearing in said plate, of a tail-vane pivoted to said plate, a ratchet-plate inclosing the pivotal end of said bearing-plate, and ratchet-plates pivoted to said tail-vane below said ratchet-plate and adapted to throw the tail-vane in and out of the wind and to lock said tail-vane in any position between a right angle to the wheel and a position parallel with the wheel.

4. In a windmill, the combination with a turn-table having antifriction-rollers, a bearing-plate pivoted to said table and resting on said rollers, a wind-wheel the shaft of which is journaled in said bearing-plate, of a tail-vane pivoted to said bearing-plate in line with the wheel-shaft, a cap or plate inclosing the pivotal end of said tail-vane and having ratchets on its inner surface, and ratchet devices pivoted to the tail-vane arm below said cap whereby the tail-vane may be thrown in and out of the wind, and connections extending from said ratchet devices for operating them.

In testimony whereof I affix my signature in presence of two witnesses.

THOMAS CARNEY.

Witnesses:
L. A. BENSON,
JAS. T. CARNEY.